United States Patent Office 2,826,531
Patented Mar. 11, 1958

2,826,531

NEMATODE-CONTROL COMPOSITIONS OF α,α′ DI-CHLORO-p-XYLENE AND METHODS OF USING

Mark G. Norris, Jr., Lake Jackson, Tex., assignor to The Dow Chemical Company, Midland, Mich., a corporation of Delaware No Drawing. Application September 13, 1955
Serial No. 534,155

5 Claims. (Cl. 167—53)

This invention relates to animal husbandry and is particularly concerned with a method and composition for the control of internal parasites in domestic animals.

Domestic animals are subject to attack by a number of different internal parasites. A majority of these parasites are classified as Helminthes and among the helminthic parasites, the nematodes include the most common parasites of domestic animals. Certain of these Helminthes such as lungworms, stomach worms and gastro-intestinal worms, including the strongyloids, cooperids and ascarids, are the causative agents of diseases such as ascariasis, trichostrongylosis and gross parasitism. The diseases are prevalent in cattle, sheep, swine, dogs and other animals, and are characterized by symptoms such as diarrhea, emaciation, anemia, coughing spells or general weakness. The prevalence of these diseases constitutes a major economic problem in the livestock industry.

The nematodes grow and mature in various organs but particularly in the gastro-intestinal tract of their host. In the normal life cycle, the eggs pass out with the fecal droppings, hatch and reach their infective larvae stage, whereupon they are ingested during grazing or, as is the case with hookworms, enter the body through the skin. In the case of ascarids, the infective eggs may be swallowed. The swallowed eggs or larvae mature primarily in the gastro-intestinal tract, but during the maturing process they may migrate or be carried by the blood to other parts of the body such as the lungs or the liver. During maturation and in the adult stage, the parasites may erode the tissues bringing about hemorrhage, anemia, weakness, serious digestive disturbances and intestinal necrosis. In addition, there may be secondary invasion by bacteria. Invasion by bacterial is especially common when lungs are affected by lungworms. Other difficulties caused by both adult and migrating forms are mechanical blocking of the air passages, the intestinal tract, or the common bile ducts. Animals, if they do not rapidly succumb to gross parasitism are oftentimes rendered economically valueless by lowered vitality, and poor growth and reproduction.

Numerous remedies have been suggested and made available for the control of internal parasites. Many of these materials have been of little efficacy while others have had an adverse effect upon the metabolism of the treated animal. Some of the difficulties encountered in the use of such materials include a depressant effect on the central nervous system, hemolysis producing a serious and perhaps fatal anemia, injury to the liver and/or kidneys, gastro-intestinal irritation, photosensitization, and photosensitized keratitis manifested by ulcerations of the cornea. These and other toxic effects have made the use of many of the remedies hazardous and unprofitable. Thus, the need for inexpensive methods for the control of nematode caused infections is well recognized as constituting one of the major problems in animal husbandry.

It is an object of the present invention to provide a new, improved practice in animal husbandry. A further object is to provide a method for the control of parasitic nematodes in animals. Another object is to provide a new method for the control of nematode diseases of the gastro-intestinal tract of animals. An additional object is the provision of a novel method for benefiting animals including the control of gastritis and other diseases caused by nematodes. A further object is the provision of novel compositions adapted to be employed in the new method. Other objects will become apparent from the following specification and claims.

The new method for benefiting animals comprises dosing animals with α,α′-dichloro-p-xylene to control diseases caused by nematode parasites and particularly those of the gastro-intestinal tract. The α,α′-dichloro-p-xylene is a crystalline solid melting at 100.5° C. and boiling at 245° C. at 60 millimeters' pressure. The compound is somewhat soluble in many organic solvents, of low solubility in water and is adapted to be readily and conveniently administered to animals. It may be administered in amounts sufficient to control internal parasites, including ascarids and hookworms, lungworms, stomach and intestinal worms such as cooperids, Haemonchus, Trichostrongylus and Ostertagia, without adversely affecting the animal.

The oral administration or feeding of an effective dosage of α,α′-dichloro-p-xylene is essential and critical for the practice of the present invention. The amount of α,α′-dichloro-p-xylene to be administered to the animals must take into account such factors as whether the administration is to be made in a single dose or in multiple doses. When the administration is to be made in a single dose the preferred dosage is from 50 to 250 milligrams per kilogram of body weight. If desired, this dose may be administered in several portions over a period of 24 hours. When the administration is to be made in daily doses over a period of from several days to three weeks, good results are obtained with daily dosages of from 20 to 100 milligrams per kilogram of body weight.

The method of the present invention may be carried out by the oral administration or force feeding of unmodified α,α′-dichloro-p-xylene. In such procedure the xylene compound is conveniently administered in a gelatin capsule or in the form of a tablet. However the present invention also embraces the employment of a liquid, drench, pellet, powder mash, mixed grain ration or other animal feed compositions containing the xylene compound. In such usage, the compound may be modified with one or more of a plurality of additaments or innocuous ingestible adjuvants including water, ethanol, skimmed milk, liquid or solid surface active dispersing agents, ingestible powders and commercial animal feeds, concentrates or supplements. Such augmented compositions are adapted to be fed to animals to supply the desired dosage of active agent or to be employed as concentrates and subsequently diluted with additional carrier to produce the ultimate compositions.

The exact concentration of α,α′-dichloro-p-xylene to be employed in the compositions may vary provided that a sufficient amount of the compositions is ingested by the animals as to provide the required dosage of active agent. For example, where individual administration is preferred, liquid, drench or solid compositions containing from 2 to 95 percent by weight may be employed to supply the desired dosage. Where the compound is provided as a constituent of the principal food ration such as with pigs and mice, the required dosage may be supplied with feed compositions containing from 0.01 to 1 percent by weight of active agent. Where the compound is provided as a constituent of feed supplements in cattle, good results are obtained with supplements containing from 0.5 to 5 percent by weight of the xylene compound. In compositions to be employed as concentrates, the active ingredient may be present in a concentration of from 5 to 95 percent by weight.

Liquid compositions containing the desired amount of α,α'-dichloro-p-xylene may be prepared by dispersing the compound in water with the aid of a suitable ionic or non-ionic surface active dispersing agent such as glycerol and sorbitan esters. The aqueous compositions may contain one or more water-immiscible oils as a solvent for the active agent. In such compositions, the water, oil and emulsifying agent constitute an aqueous emulsion carrier.

The xylene compound may be formed into wettable powders by grinding with an innocuous solid such as bentonite, fuller's earth or attapulgite and a small amount of wetting agent. These compositions may be administered in the form of capsules or tablets or dispersed in animal feed and such feed used to supply a part of the entire ration.

In the preparation of solid feed compositions, α,α'-dichloro-p-xylene may be mechanically ground with grain or dry feed compositions, or made up into capsules or tablets such as described above and then mixed in the feed. The feed may be given dry or with added water to give it mush-like consistency. Also, the compound may be dissolved in an edible oil such as coconut or cottonseed oil, and the resulting mixture dispersed in the feed. These edible oil compositions may contain one of the aforementioned emulsifying materials as a dispersing agent.

The following examples illustrate the invention but are not construed as limiting:

Example 1

A four month old heifer calf weighing 212 pounds was treated daily with α,α'-dichloro-p-xylene for a period of eight days. On a given day prior to the treatment the calf was found to have voided 121 ova of gastro-intestinal nematodes and numerous lungworm larvae per gram of feces. These ova included those of Cooperia sp., hookworm (*Bunostomum phlebotomum*), stomach and intestinal worms (Ostertagi sp., Trichostrongylus sp. and *Haemonchus contortus*), as well as larvae of the lungworm (*Dictyocaulus viviparus*). In the treating operations, 2.35 grams of the xylene compound was administered daily in the form of gelatin capsules. This corresponds to a daily dosage of 23.8 milligrams per kilogram of body weight. During the treatment the calf expelled numerous nematodes as well as lungworm larvae. Twelve days following the initiation of the treatment, the feces were examined and found to be substantially free of nematode ova and lungworm larvae.

Example 2

A pig weighing 22 kilograms and voiding a large number of *Ascaris suum* ova in its feces was treated with α,α'-dichloro-p-xylene. In the treating operations, the pig was fed a mixed grain ration containing the xylene compound in an amount sufficient to provide 100 milligrams per kilogram of body weight. During the first few days following treatment, the pig expelled numerous ascarids in the fecal dropping. Examination of portions of the feces upon the fourth day following treatment showed the presence of 20 dead ascarids.

Example 3

Twenty-five parts by weight of α,α'-dichloro-p-xylene was mechanically ground with 2 parts of a sodium alkyl aryl sulfonate (Nacconol NR), 2 parts of the compounded substituted benzoic alkyl sulfonic acids (Daxad), and 71 parts a mineral floridin diluent (Diluex) to prepare a composition which is adapted to be fed to animals or employed as a wettable powder concentrate. This composition was dispersed in water to produce a drench composition containing 2.5 percent by weight of the xylene compound.

The drench composition was directly administered to a jersey steer weighing 94.4 kilograms. The amount of drench employed was sufficient to provide 50 milligrams of xylene compound per kilogram of body weight. Prior to the administration, the steer was found to be expelling numerous ova of cooperids, hookworm, stomach worms and intestinal worms. As a result of the treatment, the steer expelled numerous intact gastro-intestinal nematodes. Examination of a portion of fecal material expelled about 24 hours following treatment showed the presence of approximately 100 dead intact nematodes.

Example 4

A young dog weighing 1.7 kilograms and voiding large numbers of ascarid ova in the feces was dosed with α,α'-dichloro-p-xylene. In such operation, the xylene compound was administered as a single dose in gelatin capsule in an amount sufficient to provide a dosage of 100 milligrams per kilogram of body weight. During the first two days following the administration, many dead intact ascarids were expelled by the pup. Upon the fourth, sixth and eleventh days following the administration, the dog's feces were examined and found to be free of ascarid ova.

Example 5

An adult dog weighing 19.4 kilograms was dosed with α,α'-dichloro-p-xylene as described in Example 4 in an amount sufficient to provide 100 milligrams per kilogram of body weight. Prior to the dosing the dog was found to be expelling numerous ascarid and hookworm ova. During the first day following the administration, the dog expelled many dead ascarids. Upon the third and fourth days the feces were examined and found to be free of ascarid and hookworm ova.

Example 6

A dog weighing 8.6 kilograms and heavily infested with hookworm was similarly treated with α,α'-dichloro-p-xylene in an amount sufficient to provide 100 milligrams per kilogram of body weight. Upon the fourth and fifth days following treatment the feces were found to be substantially free of hookworm ova.

Example 7

α,α'-Dichloro-p-xylene was incorporated in a complete mouse feed to prepare a medicated feed composition containing 0.5 percent by weight of the xylene compound. This medicated feed composition and unmodified mouse feed were fed as sole food rations to groups of mice which were heavily infested with *Nematospiroides dubius*. Seven days following the initiation of the diets, the mice were sacrificed and autopsied. An examination of each mouse was made and the medicated mice compared with the unmedicated mice as regards the number of worms to be found in their gastro-intestinal tracts. As a result of the examination there was found a substantially complete control of *Nematospiroides dubius* in the medicated mice with a continued heavy infestation in the unmedicated group.

Example 8

Gelatin capsules are charged with α,α'-dichloro-p-xylene substantially as previously described and found adapted to be employed by single dose administration to mature dogs infected with ascarids and at a stage where large numbers of ascarid ova are being voided in the feces. The dosage is 250 milligrams per kilogram of body weight. The dogs will be found to expel numerous intact ascarids during the first day following treatment and within six days the feces will be substantially free of ascarid ova.

Example 9

Ninety parts by weight of α,α'-dichloro-p-xylene is mechanically ground with 10 parts of bentonite to produce a medicated composition.

In a similar manner, a medicated composition is prepared by grinding together 50 parts by weight of α,α'-dichloro-p-xylene, 1-part of sorbitan monopalmitate (Span 20) and 49 parts of aluminum magnesium silicate (attapulgite).

In a further operation, 20 parts by weight of finely ground α,α'-dichloro-p-xylene is mixed with 80 parts of soybean meal to prepare another medicated composition.

In an additional operation, 10 parts by weight of α,α'-dichloro-p-xylene is dispersed in cottonseed oil to prepare a composition in the form of an edible oil.

These compositions are adapted to be administered to animals to supply the desired dosage of xylene compound or to be employed as concentrates and subsequently diluted with additional edible carrier and particularly with commercial animal feeds or supplements to produce feed composition containing the desired amount of active agent.

I claim:

1. In the practice of animal husbandry, the method for the control of parasitic nematodes which comprises orally administering to animals α,α'-dichloro-p-xylene in the amount of from 20 to 250 milligrams per kilogram of body weight.

2. A method for the control of parasitic nematodes which comprises feeding an animal as an active agent α,α'-dichloro-p-xylene in intimate admixture with an innocuous ingestible adjuvant, the composition being fed in an amount sufficient to provide a dosage of from 20 to 250 milligrams of the xylene compounds per kilogram of body weight.

3. A method for the control of parasitic nematodes which comprises feeding an animal as an active agent α,α'-dichloro-p-xylene in intimate admixture with an innocuous ingestible adjuvant, the composition being fed in an amount sufficient to supply a daily dosage of from 20 to 100 milligrams of the xylene compound per kilogram of body weight.

4. A method claimed in claim 3 wherein the ingestible adjuvant is an animal feed.

5. An animal feed composition comprising from 0.01 to 5 percent by weight of α,α'-dichloro-p-xylene in intimate admixture with a grain ration.

References Cited in the file of this patent

UNITED STATES PATENTS

| | | |
|---|---|---|
| 2,033,495 | Taylor | Mar. 10, 1936 |
| 2,528,151 | Kulka | Oct. 31, 1950 |